US010373260B1

(12) United States Patent
Haller, Jr. et al.

(10) Patent No.: US 10,373,260 B1
(45) Date of Patent: *Aug. 6, 2019

(54) IMAGING PROCESSING SYSTEM FOR IDENTIFYING PARTS FOR REPAIRING A VEHICLE

(71) Applicant: CCC INFORMATION SERVICES INC., Chicago, IL (US)

(72) Inventors: John Laurence Haller, Jr., Kenilworth, IL (US); Darrin A. Smith, San Antonio, TX (US)

(73) Assignee: CCC INFORMATION SERVICES INC., Chicago, IL (US)

( * ) Notice: Subject to any disclaimer, the term of this patent is extended or adjusted under 35 U.S.C. 154(b) by 584 days.

This patent is subject to a terminal disclaimer.

(21) Appl. No.: 15/016,756

(22) Filed: Feb. 5, 2016

Related U.S. Application Data

(63) Continuation-in-part of application No. 14/218,148, filed on Mar. 18, 2014, now abandoned.

(51) Int. Cl.
*G06Q 40/00* (2012.01)
*G06Q 40/08* (2012.01)
(Continued)

(52) U.S. Cl.
CPC ........... *G06Q 40/08* (2013.01); *G06K 9/6202* (2013.01); *G06Q 10/20* (2013.01); *G06T 5/50* (2013.01);
(Continued)

(58) Field of Classification Search
USPC .......................................................... 705/4
See application file for complete search history.

(56) References Cited

U.S. PATENT DOCUMENTS 4,236,211 A * 11/1980 Arvesen .................. C12Q 1/18
356/246
6,182,048 B1    1/2001 Osborn et al.
(Continued)

OTHER PUBLICATIONS

Taylor, S. A., "Assessing the use of regression analysis in examining service recovery in insurance industry: Relating service quality, customer satisfaction, and customer trust." Journal of Insurance issues, 2001, 24, 1&2, pp. 30-57.*
(Continued)

*Primary Examiner* — Olabode Akintola
(74) *Attorney, Agent, or Firm* — Marshall, Gerstein & Borun LLP (57) ABSTRACT

An image processing system includes a first image processor that creates a composite 3-D image or model of a damaged vehicle from a plurality of 2-D images of the damaged vehicle. The first image processor or another image processor of the system generates deformation data that is indicative or descriptive of points/areas of damage on the vehicle based on a comparison of the composite 3-D image/model with a 3-D image/model of a pristine vehicle. Based on the deformation data, a deformation model component generates indications of replacement parts and/or other items corresponding to repairing the vehicle by utilizing a model generated from historical claim data. Aside from receiving the initial set of images of the damaged vehicle, the system does not require any user input, and may generate the indications of replacement parts and/or other items corresponding to repairing the vehicle in real-time, such as at FNOL.

22 Claims, 4 Drawing Sheets

(51) Int. Cl.
*G06Q 10/00* (2012.01)
*G06T 5/50* (2006.01)
*G06T 15/20* (2011.01)
*G06K 9/62* (2006.01)
*G06T 17/20* (2006.01)

(52) U.S. Cl.
CPC ............ *G06T 15/205* (2013.01); *G06T 17/20* (2013.01); *G06T 2207/10016* (2013.01); *G06T 2207/30248* (2013.01)

(56) References Cited

U.S. PATENT DOCUMENTS

| | | |
|---|---|---|
| 6,408,321 B1 | 6/2002 | Platt |
| 6,470,303 B2 | 10/2002 | Kidd et al. |
| 6,812,048 B1 | 11/2004 | Kline |
| 7,072,841 B1 | 7/2006 | Pednault |
| 7,324,951 B2 | 1/2008 | Renwick et al. |
| 7,389,246 B1 | 6/2008 | Ohrt |
| 7,392,201 B1 | 6/2008 | Binns et al. |
| 7,398,218 B1 | 7/2008 | Bernaski et al. |
| 7,480,640 B1 | 1/2009 | Elad et al. |
| 7,502,772 B2 | 3/2009 | Kidd et al. |
| 7,509,235 B2 | 3/2009 | Bonissone et al. |
| 8,095,391 B2 | 1/2012 | Obora et al. |
| 8,135,599 B2 | 3/2012 | Simpson et al. |
| 8,200,513 B2 | 6/2012 | Vahidi et al. |
| 8,224,679 B1 | 7/2012 | Hopkins |
| 8,239,220 B2 | 8/2012 | Kidd et al. |
| 8,510,196 B1 | 8/2013 | Brandmaier et al. |
| 8,527,305 B1 | 9/2013 | Hanson et al. |
| 8,712,893 B1 | 4/2014 | Brandmaier et al. |
| 9,218,626 B1 | 12/2015 | Haller, Jr. et al. |
| 2002/0002475 A1 | 1/2002 | Freedman et al. |
| 2002/0007289 A1 | 1/2002 | Malin et al. |
| 2003/0101080 A1 | 5/2003 | Zizzamia et al. |
| 2003/0154111 A1 | 8/2003 | Dutra et al. |
| 2004/0024619 A1 | 2/2004 | DiBella |
| 2004/0093241 A1 | 5/2004 | Stone et al. |
| 2004/0128172 A1 | 7/2004 | Van Cleave et al. |
| 2005/0108063 A1 | 5/2005 | Madill et al. |
| 2005/0246206 A1 | 11/2005 | Obora et al. |
| 2005/0267774 A1 | 12/2005 | Merritt et al. |
| 2006/0050953 A1 | 3/2006 | Farmer et al. |
| 2007/0016542 A1 | 1/2007 | Rosauer et al. |
| 2007/0033076 A1 | 2/2007 | Sadeghi |
| 2007/0067191 A1 | 3/2007 | Loveland |
| 2007/0100669 A1 | 5/2007 | Wargin et al. |
| 2008/0255887 A1 | 10/2008 | Gruter |
| 2008/0281658 A1 | 11/2008 | Siessman |
| 2008/0281790 A1 | 11/2008 | Prosser et al. |
| 2009/0043615 A1 | 2/2009 | Belhe et al. |
| 2009/0083089 A1 | 3/2009 | Conchieri et al. |
| 2009/0138290 A1* | 5/2009 | Holden ............... G06Q 10/087 705/4 |
| 2009/0281841 A1 | 11/2009 | Basak et al. |
| 2010/0211494 A1 | 8/2010 | Clements |
| 2010/0235270 A1 | 9/2010 | Baker |
| 2011/0071859 A1 | 3/2011 | Keefer |
| 2011/0106569 A1 | 5/2011 | Price |
| 2011/0161116 A1 | 6/2011 | Peak et al. |
| 2011/0246244 A1 | 10/2011 | O'Rourke |
| 2012/0016693 A1 | 1/2012 | Haywood et al. |
| 2012/0323609 A1 | 12/2012 | Fini |
| 2013/0325541 A1 | 12/2013 | Capriotti et al. |
| 2014/0156138 A1 | 6/2014 | Klaff et al. |
| 2014/0372150 A1* | 12/2014 | Karle .................... G06Q 40/08 705/4 |
| 2015/0149218 A1 | 5/2015 | Bayley et al. |
| 2015/0213556 A1 | 7/2015 | Haller, Jr. |

OTHER PUBLICATIONS

AIPSO 2009 Annual Report (2009).
Aleia et al., "Computer system for receiving and valuing insurance claim related to e.g. automobile, has web application server to determine probability of recovery relative to claim received from insured using log data stored in data warehouse," Derwent 2010-B63090 (Feb. 11, 2010).
Boison et al., Symbols/vehicle rating inconsistent among major insurers, MHL Actuaries & Consultants newsletter (Jul. 2002).
Cacchione et al., Using predictive modeling to reduce claims losses in auto physical damage, CAS Loss Reserve Seminar 2003, Session 3—Private Passenger Automobile Insurance (Sep. 8, 2003).
Campbell, "An integrated system for estimating the risk premium of individual car models in motor insurance," ASTIN Bulletin, vol. 16, No. 2, pp. 165-183 (1986).
Curbera et al., "Computer readable storage medium storing instructions for predictive analytics of semi-structured processes in e.g. insurance company to claim automobile insurance, has instructions to predict path from any decision node to target node", DERWENT 2012-D21024 (Sep. 10, 2010).
Frequently Asked Questions, ISO: Information About Property/Casualty Insurance Risk, Verisk Analytics (Jersey City, New Jersey) (2010).
Greenacre, "Clustering Rows and Columns", IN: *Correspondence Analysis in Practice, Second Edition*, Chapman & Hall/CRC (2007).
Greenacre, Clustering the rows and columns of a contingency table, J. Classification, 4:39-51 (1988).
IntelliDent, "What is a Supplement and Why Do Most Claims Require Them?", Intellidentpaintlessrepair.com, 2013, http://www.intellidentpaintlessrepair.com/blog/what-is-a-supplement-and-why-do-most-claims-require-them/, 3pages.
ISO and PCI Report Increased Q1 Underwriting Profits by US Property/Casualty Insurers, Collision Week (Jun. 30, 2006).
Mahoney, J., "Supplements: One Way to Understand Them", Examiner.com, 2009, http://www.examiner.com/article/supplements-one-way-to-understand-them, 2 pages.
Mitchell, "Mitchell Opens Technical Research Center to Address Next-Generation Automotive Industry Needs", Mitchell.com, 2014, http://www.mitchell.com/media-center/press-releases/2013/mitchell-opens-technical-research-center-apd.asp, 4 pages.
PR Newswire, "Toyota and Mitchell Partner to Provide Breakthrough Estimating Tool for the Collision Repair Industry", PRNewswire.com, 2013, http://www.prnewswire.com/news-releases/toyota-and-mitchell-partner-to-provide-breakthrough-estimating-tool-for-the-collision-repair-industry-23051 0691.html, 2 pages.
Stockburger, "Multiple Regression with Many Predictor Variables" from Introductory Statistics: Concepts, Models and Applications (Nov. 3, 2006): <http://web.archive.org/web/20060911050903/http://www.psychstat.missouristate.edu/multibook/mlt07.htm <http://web.archive.org/web/20060911050903/http:/www.psychstat.missouristate.edu/multibook/mlt07.htm>.
Stockburger, "Regression Models" from Introductory Statistics: Concepts, Models and Applications (Apr. 27, 2006).
U.S. Appl. No. 12/792,104, "Systems and Methods of Predicting Vehicle Claim Cost", filed Jun. 2, 2010.
U.S. Appl. No. 14/168,345, "System and Method of Predicting a Vehicle Claim Settlement Between an Insurance Carrier and a Repair Facility", filed Jan. 30, 2014.
U.S. Appl. No. 14/218,148, "System and Method of Predicting Vehicle Claim Information Based on Deformation Images", filed Mar. 28, 2014.
U.S. Appl. No. 14/218,165, "System and Method of Predicting Vehicle Claim Information Based on Image Attributes", filed Mar. 18, 2014.
U.S. Appl. No. 14/460,907, "System and Method of Predicting Vehicle Claim Information Based on Image Attributes", filed Aug. 15, 2014.

* cited by examiner

IMAGING PROCESSING SYSTEM FOR IDENTIFYING PARTS FOR REPAIRING A VEHICLE

CROSS-REFERENCE TO RELATED APPLICATIONS

This application is a continuation-in-part of U.S. patent application Ser. No. 14/218,148, entitled "SYSTEM AND METHOD OF PREDICTING VEHICLE CLAIM INFORMATION BASED ON DEFORMATION IMAGES" and filed on Mar. 18, 2014, the entire disclosure of which is hereby incorporated by reference herein.

This application is related to commonly-owned U.S. patent application Ser. No. 14/218,165, entitled "SYSTEM AND METHOD OF PREDICTING VEHICLE CLAIM INFORMATION BASED ON IMAGE ATTRIBUTES" and filed on Mar. 18, 2014, the entire disclosure of which is hereby incorporated by reference herein. Additionally, this application is related to commonly-owned U.S. Pat. No. 8,239,220 entitled "METHOD AND APPARATUS FOR OBTAINING PHOTOGRAMMETRIC DATA TO ESTIMATE IMPACT SEVERITY," and to commonly-owned U.S. Pat. No. 8,095,391 entitled "SYSTEM AND METHOD FOR PERFORMING REINSPECTION IN INSURANCE CLAIM PROCESSING," the entire disclosures of which are hereby incorporated by reference herein.

Further, this application is related to commonly-owned U.S. patent application Ser. No. 12/792,104, entitled "SYSTEMS AND METHODS OF PREDICTING VEHICLE CLAIM COST" and filed on Jun. 2, 2010; to commonly-owned U.S. patent application Ser. No. 14/168,345, entitled "SYSTEM AND METHOD OF PREDICTING A VEHICLE CLAIM SUPPLEMENT BETWEEN AN INSURANCE CARRIER AND A REPAIR FACILITY" and filed on Jan. 30, 2014; to commonly-owned U.S. patent application Ser. No. 14/460,907, entitled "SYSTEM AND METHOD OF PREDICTING VEHICLE CLAIM INFORMATION BASED ON IMAGE ATTRIBUTES" and filed on Aug. 15, 2014; and to commonly-owned U.S. patent application Ser. No. 14/168,327, entitled "SYSTEMS AND METHODS OF PREDICTING VEHICLE CLAIM RE-INSPECTIONS" and filed on Jan. 30, 2014, the entire disclosures of which are hereby incorporated by reference herein.

Still further, this application is related to commonly-owned U.S. Pat. No. 9,218,626 and entitled "AUTOMATIC PREDICTION AND RECOMMENDATION OF PARTS, MATERIALS, AND SERVICES FOR VEHICLE INSURANCE CLAIM ESTIMATES AND SUPPLEMENTS," the entire disclosure of which is hereby incorporated by reference herein.

FIELD OF THE DISCLOSURE

The present disclosure generally relates to automatic determination, based on processing of images of a damaged vehicle and pre-processed images of undamaged vehicles, the particular areas of damage and the extent of damage to the vehicle, as well as replacement parts, and/or other items, needed for and/or corresponding to repairing the vehicle.

BACKGROUND

When an insured vehicle is damaged and a vehicle insurance claim is made, typically a representative of the insurance company or carrier (e.g., an adjustor, assessor, or other agent) assesses the damage and generates an estimate of a settlement payment from the insurance company to a repair facility for repairing at least some portion of the damages to the vehicle, e.g., a "settlement estimate" at the insurance company/repair facility interface. This preliminary settlement estimate can include an initial list of parts that are thought of or initially determined as being needed to repair the vehicle, e.g., replacement parts. Typically, this initial list is generated by representative or agent of a repair shop or insurance company/carrier who manually generates the list based on his or her own experiences, e.g., by free response and/or by checking of boxes on a pre-populated list or form, by annotating images or pictures, or by being prompted by computer program to fill in fields and/or text. This initial list may be provided to or used by a particular repair facility that is to perform the repair work.

In many cases, upon performing its own inspection of the vehicle or upon tearing down the vehicle, the particular repair facility finds additional damage that was not identified in the estimate provided by the insurance carrier, as, for example, the repair facility is able to further access the vehicle and perform a more thorough examination than could an adjustor who generally writes estimates based only on damages he or she can see, discern, or identify first-hand. When damages and/or costs that were not indicated in the estimate are discovered, the repair facility requests an additional monetary amount or a "supplement" from the insurance carrier corresponding to the newly identified damages and/or costs. In some situations, the insurance carrier agrees to the supplement amount straightaway, and in some situations, the insurance carrier negotiates with the repair facility to agree on a set of authorized additional repairs and an amount of the supplement to cover the additional repairs. For some claims, more than one supplement may be requested during the claims resolution process, for example, when still additional damage is uncovered, when replacement parts are difficult to find, and for other reasons. An example description of settlements and supplements of vehicle insurance claims is provided in aforementioned, commonly owned U.S. patent application Ser. No. 14/168, 345, entitled "SYSTEM AND METHOD OF PREDICTING A VEHICLE CLAIM SUPPLEMENT BETWEEN AN INSURANCE CARRIER AND A REPAIR FACILITY."

In addition to generating estimated and actual monetary amounts, the claims resolution process may generate or produce occurrences of particular events, such as the generation of one or more supplement events. In another example, for a given vehicle insurance claim, one or more re-inspection events may occur during the claims resolution process. "Re-inspection," as used herein, generally refers to auditing and evaluating the accuracy, quality, and timeliness of claim estimates and appraisals during the claims resolution process. Typically, a subset of all claims serviced by the repair facility is identified, by one or more human re-inspectors, for re-inspection. In most scenarios, the re-inspectors review the identified claims with respect to cost, claim cycle time, accuracy of supplement estimates, limitations, discounts, and/or other criteria by using a re-inspection score sheet or checklist. Examples of re-inspection processes are described in aforementioned, commonly owned U.S. Pat. No. 8,095,391 and in aforementioned, commonly owned U.S. patent application Ser. No. 14/168, 327 entitled "SYSTEMS AND METHODS OF PREDICTING VEHICLE CLAIM RE-INSPECTIONS."

The vehicle insurance claims resolution process may generate or produce one or more customer service indicators (CSIs) or customer service scores that are indicative of customer feedback or the customer experience throughout the claims resolution process. For example, one CSI score may reflect the experience of a customer at First Notice of Loss (FNOL), another CSI score may reflect the customer's experience at the repair facility, and still another CSI score may reflect the customer's overall satisfaction with the resolution of the claim.

Indications of other resources, monetary amounts, costs, information, or other such items may be generated during the vehicle insurance claims resolution process. For example, an estimate and an actual final cost of parts needed to repair the damage to the vehicle may be generated by the claims resolution process, and/or an estimate and an actual final cost of labor to repair the damage to the vehicle may be generated by the claims resolution process. Additionally or alternatively, a final settlement or payout amount to be paid by the insurance carrier to an insured party may be generated or produced by the claims resolution process.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In an embodiment, a system includes a network interface via which a plurality of images of a damaged vehicle is received at the system. The system also includes a composite image generator component that is configured to construct or create a composite, three-dimensional image of the damaged vehicle from the plurality of images of the damaged vehicle, and a damage profile generator component that is configured to compare the constructed, composite three-dimensional image of the damaged vehicle with a stored, three-dimensional image of an undamaged vehicle, and that is further configured to generate deformation data corresponding to a crush profile of the damaged vehicle based on the comparison.

Further, the system includes one or more data storage devices storing historical claim data of a plurality of historical vehicle insurance claims, an access mechanism to the historical claim data, and a deformation model component that is configured to generate, based on the generated deformation data of the damaged vehicle, respective indications of one or more replacement parts and/or other items or resources that are needed to repair the damaged vehicle, and/or other information corresponding to repairing the damaged vehicle. The deformation model component includes a deformation model that is generated by accessing, via the access mechanism, the historical claim data of the plurality of historical vehicle insurance claims, and by performing a regression analysis on the accessed historical claim data to determine a subset of a plurality of claim attributes that are more strongly correlated to actual replacement parts and/or other items or information corresponding to the plurality of historical vehicle insurance claims than are other attributes of the plurality of claim attributes. The historical claim data includes deformation data of the plurality of historical vehicle insurance claims, respective indications of the actual replacement parts, other items, and/or other information included in the plurality of historical vehicle insurance claims, and a plurality of other claim attributes of the plurality of historical vehicle insurance claims, for example.

Still further, the system includes an output interface via which the generated, respective indications of the one or more replacement parts, other items, and/or the other information corresponding to repairing the damaged vehicle are provided to at least one of the network interface or a user interface.

DETAILED DESCRIPTION

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents. As used herein, the term "vehicle" may include a car, an automobile, a motorcycle, a truck, a recreational vehicle, a van, a bus, a boat or other amphibious vessel, heavy equipment, or any other insurable mode of transportation.

Figure 1:
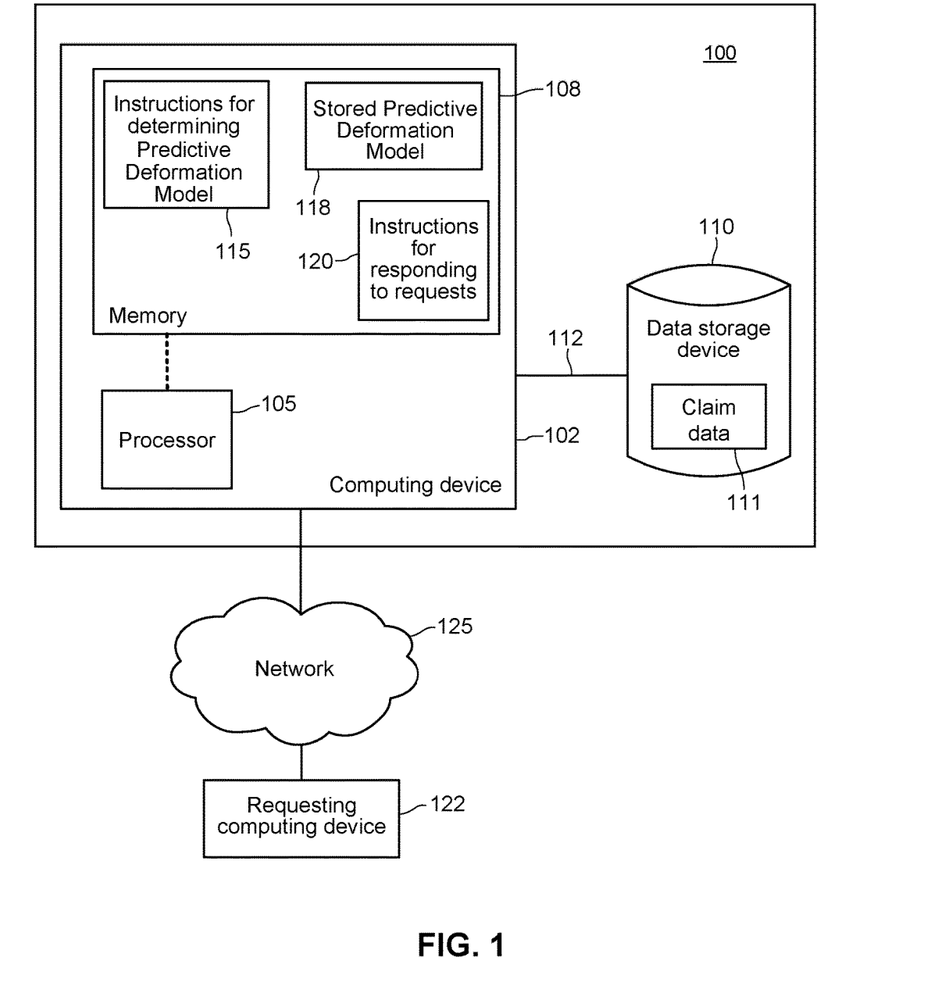
FIG. 1 is a block diagram of an exemplary system for predicting, based on vehicle deformations, vehicle insurance claim information generated by the claims resolution process, including replacement parts and/or other items or information corresponding to repairing a damaged vehicle.

FIG. 1 is a block diagram of an exemplary system 100 for predicting, determining, and/or generating, based on vehicle deformations, vehicle insurance claim information, which may include replacement parts and/or other items or information corresponding to repairing a damaged vehicle. In an embodiment, the predicted, determined, and/or generated information corresponding to repairing the damaged vehicle may be generated during the process of resolving an insurance claim for a damaged vehicle, or as desired. "Vehicle insurance claim information" or "vehicle claim information," as interchangeably used herein, generally refers to information that is or may be generated during and at the final resolution of a vehicle claims resolution process. For example, vehicle claim information may include indications of replacement parts that are needed to repair the vehicle as well as other resources that are needed for or otherwise utilized in the process of repairing the vehicle, such as types of labor, labor costs, paint costs, towing costs, hazardous waste disposal costs, and the like.

Other examples of vehicle claim information include one or more types of amounts (e.g., monetary amounts expressed in units of currency or as a percentage) that may be generated at various stages of resolving a vehicle insurance claim. An example of a type of amount that may be predicted, determined, and/or generated by the system 100 is a settlement amount between a repair facility and an insurance carrier providing the insurance policy covering the damaged vehicle, where the settlement amount is a monetary amount to be paid by the insurance carrier to the repair facility for repairing at least some of the damage to the vehicle. Another example of a type of amount that may be predicted, determined, and/or generated by the system 100 is a supplement amount to an estimate of a settlement between the insurance carrier and the repair facility for the vehicle insurance claim. In this example, the supplement amount is an additional monetary amount corresponding to additional costs of repairing the vehicle that were not indicated with the estimate of the settlement. The settlement estimate may have been automatically predicted or provided by the system 100, or the settlement estimate may have been provided by another source. The supplement amount may be expressed in units of currency, for example, or the supplement amount may be expressed as a percentage of the settlement estimate. Yet other examples of types of vehicle insurance claim amounts which may be predicted, determined, and/or generated by the system 100 may include a settlement amount between the insurance carrier and an insured party, and an amount of a cost of parts and/or of labor needed to repair the vehicle, e.g., to a defined level of quality. Generally, any one or more monetary amounts that are generated during the process of resolving and finalizing a vehicle insurance claim may be predicted, determined, and/or generated by the system 100.

Vehicle claim information that is able to be predicted, determined, and/or generated by the system 100 may additionally or alternatively include one or more types of scores that are generated during the process of resolving and finalizing a vehicle insurance claim. An example of a score that may be predicted by the system 100 is a supplement score indicative of a probability of an occurrence of a non-zero supplement amount for the vehicle insurance claim. Other examples of types of scores that may be predicted, determined, and/or generated by the system 100 include a re-inspection score indicative of a probability of an occurrence of a re-inspection of any or all portions of the vehicle insurance claim, and a customer service indicator (CSI) or customer satisfaction score provided by a customer (e.g., an insured party) during any part of the claims resolution process. Generally, any type of score associated with a probability of an event occurring during the resolution process of a vehicle insurance claim and/or associated with customer feedback generated during the resolution process of a vehicle insurance claim may be predicted, determined, and/or generated by the system 100.

The system 100 for predicting, determining, and/or determining vehicle insurance claim information such as replacement parts, other items, and/or other information corresponding to repairing a damaged vehicle based on deformation of the vehicle includes a computing device 102 which, for the sake of illustrating the principles described herein, is shown as a simplified block diagram of a computer. However, such principles apply equally to other electronic devices, including, but not limited to, cellular telephones, personal digital assistants, wireless devices, laptops, cameras, tablets, smart phones or devices, media players, appliances, gaming systems, entertainment systems, set top boxes, and automotive dashboard electronics, to name a few. In some embodiments, the computing device 102 may be a server or a network of computing devices, such as a public, private, peer-to-peer, cloud computing or other known network.

The computing device 102 includes at least one processor 105 and at least one non-transitory, tangible computer-readable storage media or device 108, such as a memory. The computing device 102 may be a single computing device 102, or may be a plurality of networked computing devices. In some cases, the computing device 102 is associated with an insurance carrier. In some cases, the computing device 102 is associated with a repair facility. In some cases, the computing device 102 is associated with a third party that is not an insurance carrier (e.g., does not directly sell or issue insurance policies) and that is not a repair facility (e.g., does not perform vehicle repairs), but may be in communicative connection with a computing device associated with the insurance carrier and/or with a computing device associated with a repair facility.

As shown in FIG. 1, the computing device 102 is operatively connected to a data storage device 110 via a link 112. The data storage device 110 may be a single storage device, or may be one or more networked data storage devices. Although FIG. 1 illustrates the data storage device 110 as being separate from the computing device 102, in some embodiments the data storage entity 110 may be contained within the same physical entity as the computing device 102. The link 112 may be as simple as a memory access function, or it may be a wired, wireless, or multi-stage connection through a network. Many types of links are known in the art of networking and may be contemplated for use in the system 100.

The data storage device 110 includes or stores claim data 111, such as claim data related to historical vehicle insurance claims from one or more insurance companies or carriers, and/or from other sources such as repair shops, body shops, accident report databases, etc. Each data point in the claim data 111 corresponds to a particular historical vehicle insurance claim and includes one or more types of information corresponding to the claim, such as replacement parts, labor types and labor costs, a final claim settlement amount, amounts and/or scores generated during various stages of the claims resolution process, vehicle owner or insured information, information regarding the accident or incident resulting in the claim, vehicle attribute information (e.g., make, model, odometer reading, etc.), towing costs, hazardous material disposal costs, paint costs, tire costs, labor hours, and/or other information corresponding to repairing the subject damaged vehicle. The different types of information or data that are stored for a vehicle insurance claim are generally referred to interchangeably herein as "vehicle insurance claim attributes," "vehicle claim attributes," "vehicle claim parameters," "claim attributes," "claim parameters," or "claim data types."

One type of claim attribute that is included in at least some of the claim data points 111 is deformation data. Generally, deformation data is descriptive or indicative of the deformation to the subject vehicle of the respective vehicle insurance claim. The deformation data may be represented in any suitable format, such as by a crush profile of the subject vehicle, by one or more collision deformation codes or "CDCs" (e.g., as defined by the Society of Automotive Engineers International Surface Vehicle Standard J224 or by some other standards body), and/or by some other suitable or desired indicators representing different portions of the subject vehicle and the extent of the respective deformations included thereon.

Another type of claim attribute that may be included for at least some of the claim data points 111 are customer service indicators (CSIs) or customer satisfaction scores of a respective vehicle insurance claim. A claim data point may include one CSI score associated with the claim, or may include multiple CSI scores indicative of multiple feedback points obtained at multiple points of the claims resolution process, e.g., a CSI for the overall claims resolution process, another CSI for the performance of repair facility, another CSI for the insured party/insurance carrier interface, etc. CSIs may be scaled across the claim data 111.

Further, each particular data point of the historical claim data 111 may correspond to a partial or a total loss claim. For a partial loss claim, typically the vehicle was repaired by one or more repair facilities, and thus the corresponding data point may include claim attributes corresponding to an initial repair estimate, a final settlement amount between the insurance company and one of the repair facilities, types and costs of replacement parts, labor costs, a location of the repair facility, and the like. Other types of claim attributes that may be included for a partial loss claim are an indication as to whether or not a supplement was generated for the claim, and if a supplement was generated, the monetary amount of the supplement. The claim data point may include one or more claim attributes corresponding to an indication of whether or not a re-inspection occurred for the claim, and if a re-inspection did occur, the cost of performing the re-inspection (e.g., cost to the insurance carrier and/or cost to the repair facility). Additionally, the claim data point may include one or more claim attributes corresponding to the differential between an estimate that occurred after the re-inspection and an estimate performed prior to the re-inspection (e.g., an estimate performed at First Notice of Loss (FNOL) or other estimate). For a total loss claim, such as when a vehicle was stolen or was totaled, the corresponding data point may include claim attributes corresponding to a location of vehicle loss and an amount of a payment from the insurance carrier to the insured.

A list of types of claim data information, parameters or attributes that may be included in the claim data 111 follows:
Insurance policy number
Insurance company or carrier holding the insurance policy
Identification of insured party
Vehicle owner name; street, city and state address; zip code
Location (e.g., state and zip code) where vehicle loss occurred
Zip code where vehicle is garaged
Vehicle driver name; age; street, city and state address; zip code
Vehicle Identification Number (VIN)
Vehicle make, model, model year, country of origin, manufacturer
Vehicle type or body style (e.g., sedan, coupe, pick-up, SUV, wagon, van, hatchback, convertible, etc.)
Vehicle odometer reading
Vehicle engine size, color, number of doors
Whether or not the vehicle is leased
Age of vehicle
Condition of vehicle
Settlement amount between insurance company and repair facility
Payout amount (if any) to insured party or party holding the insurance policy
Loss date
Vehicle appraisal inspection location and responsible adjustor
Primary and secondary point of impact
Vehicle drivable condition
Airbag deploy condition
Qualitative severity of damage
Quantitative severity of damage
Velocity of vehicle just prior to impact
Change in velocity of vehicle due to impact
Vehicle dimension score
Vehicle repair score
Initial estimate
Estimate or prediction of settlement at FNOL
Estimate from another repair facility or party
One or more additional estimates and indications of when during the claim settlement process the additional estimates occurred
Occurrence of one or more re-inspections
Cost to perform each re-inspection
Revised estimate after re-inspection and corresponding repair work/parts
Occurrence of one or more supplements paid from insurance company to repair facility
Monetary amount of each supplement
Level of desired target quality of repair
Level of actual quality of repair
Deductible
Towing and storage costs
Labor hours and costs for replacement and/or repair, and
Type of labor (e.g., sheet metal, mechanical, refinish, frame, paint, structural, diagnostic, electrical, glass, etc.)
Type of replacement part (e.g., OEM (Original Equipment Manufactured), new, recycled, reconditioned, etc.)
Cost of replacement part
Paint costs
Tire costs
Hazardous waste disposal costs
Repair facility name, location, state, zip code
Drivability indicator As illustrated in the above, some of the claim parameters or attributes of claim data points are vehicle parameters that are indicative of attributes of a vehicle. Some claim parameters or attributes are indicative of attributes of a driver, an owner, or an insured party of the vehicle, and some claim parameters or attributes may pertain to the insurance policy itself and/or to the resolution of the claim. Some claim parameters or attributes are indicative of the impact, collision or damage-causing incident. Some claim parameters or attributes are indicative of resources (e.g., parts, materials, other items, labor, costs, and/or other resources or costs) that are needed for or otherwise correspond to repairing the subject damaged vehicle. It is understood that not every data point or vehicle claim in the claim data 111 is required to include every claim attribute in the list above. Indeed, some data points or vehicle claims in the claim data 111 may include claim attributes that are not on the list.

Turning back to FIG. 1, the memory 108 of the computing device 102 comprises non-transitory, tangible computer-readable storage media, such as, but not limited to RAM (Random Access Memory), ROM (Read Only Memory), EEPROM (Electrically Erasable Programmable Read-Only Memory), flash memory or other memory technology, CD (Compact Disc)-ROM, digital versatile disks (DVD) or other optical disk storage, magnetic cassettes, magnetic tape, magnetic disk storage or other magnetic storage devices, biological memories or data storage devices, or any other medium which can be used to store desired information and which can be accessed by the processor 105. In some embodiments, the memory 108 comprises more than one computer-readable storage media device and/or device type.

The memory 108 includes computer-executable instructions 115 stored thereon for determining a predictive deformation model 118. Generally, the predictive deformation model 118 includes one or more independent variables, one or more dependent variables, and one or more mappings between values of the one or more independent and dependent variables. In the system 100 for predicting vehicle claim information based on deformation images, the one or more independent variables that are input into the deformation model 118 to determine values of the dependent variables includes at least some of the deformation data of the subject damaged vehicle, and optionally may include other vehicle claim and/or vehicle attributes. The dependent variables of the predictive deformation model 118 include one or more variables corresponding to predictions, determinations, and/or generations of replacement parts, materials, other items, labor types, labor costs of amounts, scores, other information that may be generated during a claims resolution process for a vehicle insurance claim, and/or other information corresponding to repairing a subject damaged vehicle.

To determine the predictive deformation model 118, the one or more independent variables, the one or more dependent variables, and the one or more mappings between dependent and independent variables included therein, the computer-executable instructions 115 include instructions for obtaining claim data 111 corresponding to a plurality of historical vehicle insurance claims (e.g., vehicle insurance claims that have been made and settled) from the data storage device 110. The historical claim data 111 includes respective values of at least some of the parameters or claim attributes listed above, and/or may include respective values of other claim attributes. In particular, the historical claim data 111 may include, for a plurality of historical vehicle claims, deformation data, actual vehicle claim information (e.g., actual replacement parts, other items, labor types, labor costs, paint costs, replacement part types, amounts, scores, other information that was generated during the claims resolution process of historical vehicle insurance claims, and/or other information that was generated as a result of repairing the subject damaged vehicles), and a plurality of other claim attributes. Obtaining the claim data 111 from the data storage device 110 may include performing a database read or some other database access function, or may include initiating a message exchange between the computing device 102 and the data storage device 110. In some embodiments, obtaining the claim data 111 may include obtaining all claim attribute values for a particular data point. In some embodiments, obtaining the claim data may include obtaining a subset of all parameter or claim attribute values that are available for the particular data point.

The computer-executable instructions 115 for determining the deformation model 118 include instructions for performing a data analysis on the obtained claim data 111 to determine a subset of the plurality of claim attributes or parameters that are most closely correlated to vehicle claim information (e.g., to replacement parts, other items, labor types, labor costs, paint costs, replacement part types, amounts, scores, costs, other information that is or may be generated during the claims resolution process, and/or other information that is needed for and/or corresponds to repairing a damaged vehicle) across the claim data 111, for example. In some cases, the types of vehicle claim information that are desired to be predicted, determined, and/or generated may be selected or otherwise indicated to the deformation model 118. A single type of vehicle claim information that is desired to be predicted, determined, and/or generated may be selected or indicated to the deformation model 118, or multiple types of vehicle claim information may be selected or indicated. Additionally, the data analysis performed on the obtained claim data 111 may be, for example, a linear regression analysis, a multivariate regression analysis such as the Ordinary Least Squares algorithm, a logistic regression analysis, a K-th nearest neighbor (k-NN) analysis, a K-means analysis, a Naïve Bayes analysis, another suitable or desired predictive data analysis, one or more machine learning algorithms, or some combination thereof.

The subset of the plurality of attributes or parameters that are most closely correlated to the desired type(s) of actual vehicle claim information across the claim data 111 are identified as the independent variables of the predictive deformation model 118. In an embodiment, at least some of the deformation data are independent variables of the predictive deformation model 118. For example, the data analysis may determine that the certain types of deformation data are independent variables of the model 118 (e.g., crush greater than X inches in the hood, or a particular value combination of two of the CDC code digits). Additionally or alternatively, in some situations, the data analysis may determine that one or more other claim attributes other than deformation data are independent variables of the predictive deformation model 118 (e.g., a year of manufacture of the subject vehicle, or a length of time that the policy has been in force).

In some embodiments, the instructions 115 for determining a predictive deformation model 118 include instructions for determining a weighting of independent variables commensurate with the strength of their respective correlation to one or more dependent variables. In these embodiments, the instructions 115 predict, determine, and/or generate the vehicle claim information based on the weighting of values of the independent variables for the particular vehicle insurance claim. For example, to predict, determine, and/or generate a customer service indicator score, if a length of a deformation on the side of a vehicle is found (via the data analysis) to be more strongly correlated to the CSI than is a depth of crush at the rear of the vehicle, the instructions 115 may give priority to fitting an indication of the length of a side panel deformation to independent variable values (or ranges thereof) over fitting the depth of deformations at the rear of the damaged vehicle.

A total number of independent variables of the predictive deformation model 118 may be configurable or selectable. For example, the total number of independent variables may be limited to include only parameters that have a t-statistic greater than a certain threshold, where the t-statistic is a measure of how strongly a particular independent variable explains variations in a dependent variable. Additionally or alternatively, the total number of independent variables may be limited to include parameters that have a P-value lower than another threshold, where the P-value corresponds to a probability that a given independent variable is statistically unrelated to a dependent variable.

Still further, the total number of independent variables may be additionally or alternatively limited based on an F-statistic, where the F-statistic evaluates an overall statistical quality of the predictive deformation model 118 with multiple independent variables. For example, all of the determined independent variables may be initially included in the predictive deformation model 118, and those independent variables with lower t-statistics may be gradually eliminated until the F-statistic for the predictive deformation model 118 increases to a desired level. Of course, the number of independent variables may be additionally or alternatively configured based on other statistical or non-statistical criteria as well, such as user input.

The computer-executable instructions 115 include instructions for determining the one or more mappings between values of the independent variables and the dependent variables of the deformation model 118. For example, values (or ranges thereof) of the parameters or attributes determined to be independent variables may be mapped to values (or ranges thereof) of predicted, determined, and/or generated amounts, scores, parts, materials, other items, costs, other information that is or may be generated by the claims resolution process for a vehicle insurance claim, and/or other information that may be needed for or may correspond to repairing a damaged vehicle. In some embodiments, different values or ranges of values of the independent variables may be grouped or segmented for manageability purposes.

In some embodiments of the system 100, the instructions 115 for determining the predictive deformation model 118 include instructions for performing a cluster analysis on the claim data 111 prior to performing the data analysis. A cluster analysis may be performed to whittle the plethora of candidate independent variables represented within the claim data 111 down to a manageable or desired number of clusters, so that a similarity between data points within a cluster is maximized and a similarity between various clusters is minimized. For example, a cluster analysis of claims included in the claim data 111 based on an average actual settlement cost may be performed, resulting in a set of clusters of vehicle insurance claims where the claims in each cluster are most closely interrelated based on average actual settlement cost. In another example, a clustering of vehicle insurance claims based on perceived damage severity level may be performed, resulting in a different set of vehicle insurance claim clusters. Other example of clustering based on other claim attributes may be possible. The cluster analysis may be performed by any known clustering algorithm or method, such as hierarchical clustering, disjoint clustering, the Greenacre method (e.g., as described in Greenacre, M. J. (1988), "Clustering Rows and Columns of a Contingency Table," *Journal of Classification*, 5, pp. 39-51), or portions, variations or combinations thereof.

The number of clusters obtained from a cluster analysis may be configurable or selectable. For example, a desired number of clusters may be based on user input. Additionally or alternatively, the desired number of clusters may be based on a desired level of similarity or dissimilarity between clusters. Other bases for configuring the number of clusters are also possible.

After the predictive deformation model 118 (including independent variables, dependent variables, and mappings) is determined by the instructions 115, the deformation model 118 may be stored in the memory 108. Alternatively or additionally, some or all portions of the deformation model 118 may be stored in the data storage device 110.

In FIG. 1, the memory 108 includes further computer-executable instructions 120 stored thereon for receiving a request to predict, determine, and/or generate vehicle claim information which may correspond to a particular vehicle insurance claim, e.g., for a new claim or for a claim that is not included in the historical claim data 111. In an embodiment, the computer-executable instructions 120 are for receiving the request to predict, determine, and/or generate respective indications of one or more replacement parts, materials, other items, labor types, labor costs, and/or other values of parameters corresponding to repairing a subject damaged vehicle, which may or may not correspond to a vehicle insurance claim. In some embodiments (not shown), the computer-executable instructions 115 and 120 may both be included in a single set of instructions, but in FIG. 1 they are shown as separate entities 115, 120 for clarity of discussion.

Additionally, in FIG. 1, the requesting entity is illustrated as being a requesting computing device 122, but this is only exemplary, as the requesting entity may be another type of entity such as a human who interacts with the system 100 via a local or remote user interface or an application executing on the computing device 102, the computing device 122, or another computing device. In FIG. 1, the requesting computing device 122 is communicatively coupled to the computing device 102 via a network 125. The network 125 may be, for example, a private local area network, a wide area network, a peer-to-peer network, a cloud computing network, the Internet, a wired or wireless network, or any combination of one or more known public and/or private networks that enable communication between the computing devices 122 and 102. In some embodiments, the network 125 may be omitted, such as when the computing device 122 and the computing device 102 are directly connected or are an integral computing device.

In some scenarios, the requesting computing device 122 may be a tablet, laptop, smart device, server, or other computing device that is associated with, owned or operated by the insurance company. For example, the requesting computing device 122 may be a tablet, laptop, or smart device used by a field assessor while the assessor is at a field site inspecting vehicle damage, e.g., at FNOL. In another example, the requesting computing device 122 may be a back-end computing server or network of computing devices of the insurance company that processes all incoming claims, or the requesting computing device 122 may be a host of a website that agents of the insurance company are able to access via a browser.

In some scenarios, the requesting computing device 122 may be a tablet, laptop, smart device, server, or other computing device associated with, owned or operated by the repair facility. For example, the requesting computing device 122 may be a tablet, laptop, smart device, or desktop computing device located at the repair facility that is used to track customers and repairs to their vehicles. In another example, the requesting computing device 122 may be a computing server or network of computing devices at a back-end office of an owning company of the repair facility that processes vehicle repair work orders related to insurance claims for many repair facilities.

Returning to the memory 108, the further computer-executable instructions 120 stored thereon are executable to receive the request for predicting, determining, and/or generating vehicle claim information. In some scenarios, the request includes an indication of a type of vehicle claim information that is desired to be predicted, determine, and/or generated, e.g., replacement parts, items, and/or other resources needed to repair the subject vehicle, a settlement amount between the insurance carrier and a repair facility, a payout amount from the insurance carrier and an insured party, a probability of a re-inspection, a CSI score, other types of amounts, scores, and/or other information that may be generated during the claims resolution process for a vehicle insurance claim, and/or other information/values of parameters corresponding to repairing the subject vehicle, such as previously discussed.

In some scenarios, the request received at the system 100 to predict, determine, and/or generate vehicle claim information includes deformation data indicative or descriptive of the damage to the subject vehicle. As discussed above, the deformation data indicative or descriptive of the damage to the vehicle may be represented in any suitable format, for example, by one or more collision deformation classifications or codes ("CDCs"), e.g., as defined by the Society of Automotive Engineers (SAE) International Surface Vehicle Standard J224. As commonly known, SAE J224 provides a classification system for collision contact deformation that uses a seven-digit alphanumeric code arranged in a specific order. The values of the code digits describe the detail for a particular deformation (such as its location on the vehicle, direction of force, size of the deformation area, extent of deformation, etc.) and, when combined together, form a composite description of a particular deformation to the vehicle. Of course, codes or other indications defined by other standards bodies may be additionally or alternatively utilized to provide deformation data included in the request.

Figure 2A:
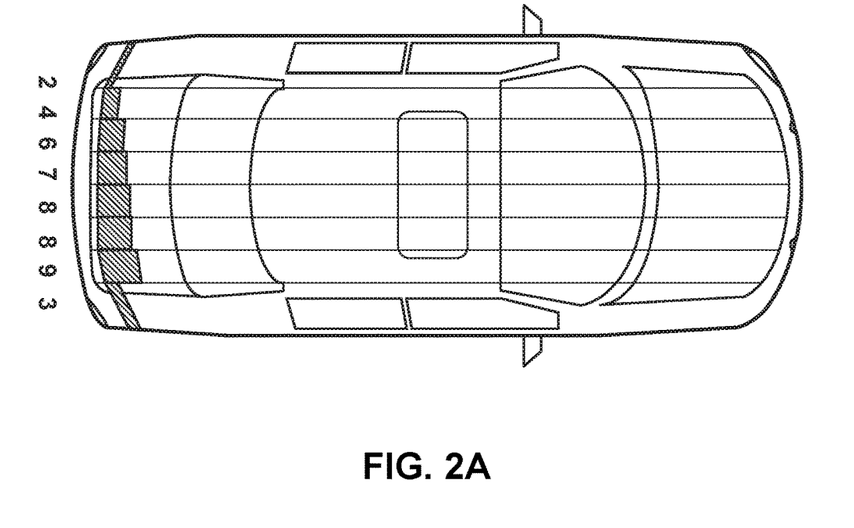
FIGS. 2A and 2B illustrate examples of zones of a vehicle that may be used in determining the vehicle's crash profile.
Figure 2B:
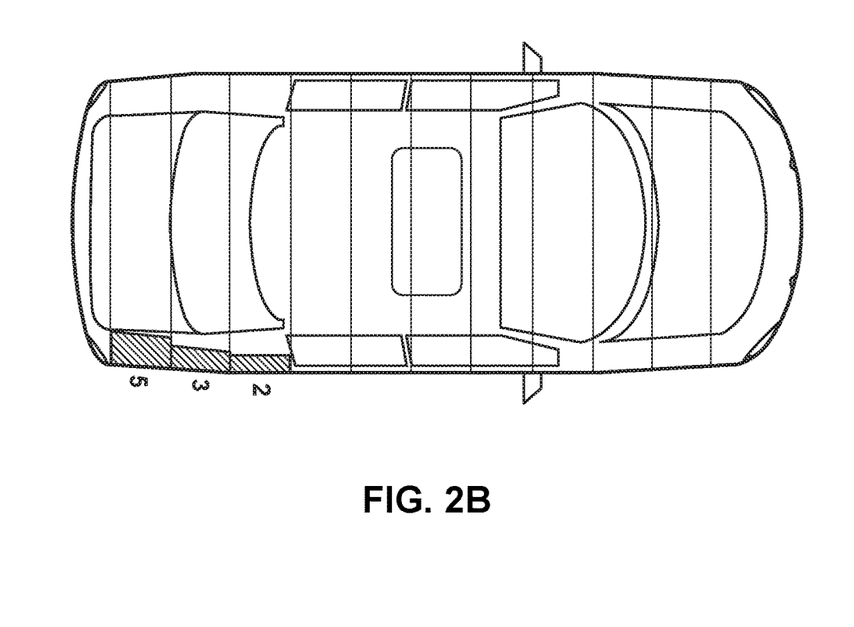

Additionally or alternatively, at least some or all of the deformation data indicative or descriptive of the damage to the vehicle may be represented by one or more indications of a crush profile of the damaged vehicle. A "crush profile," "crush damage profile" or "vehicle damage profile" of a vehicle, as interchangeably used herein, generally refers to the cumulative locations and extents of deformations of a damaged vehicle, which may be presented on a display or other visual format in some situations. For example, a vehicle may be logically divided into various zones along the front to back axis (e.g., transverse axis) of the vehicle (as shown in FIG. 2A), and may be logically divided into various zones along the lateral axis of the vehicle (as shown in FIG. 2B). Each particular portion of the vehicle defined by a particular intersection of zones may be examined to determine the difference in crush between the damaged vehicle with respect to a corresponding portion of a comparable, undamaged vehicle, and the composite of the crush differences across the intersecting zones forms the crush profile of the damaged vehicle. The crush profile thus may be expressed as a plurality of data points, vectors, or other suitable indicators, each of which represents a respective portion (e.g., one or more particular intersections of zones) of the vehicle and the magnitude(s) of the respective crush differences thereon, and at least a portion of the plurality of data points, vectors, or other suitable indicators may be provided to the system 100 as deformation data of the vehicle. It is noted that while FIGS. 2A and 2B illustrate logical cross-zoning across a top view of a vehicle, additional logical cross-zoning of other views (e.g., lateral view, bottom view, front view, etc.) may also be utilized in the determination of the vehicle's crush profile.

In some scenarios, the request received at the system 100 to predict, determine, and/or generate vehicle claim information does not include specific deformation data for the damaged vehicle. Rather, the request includes or indicates a plurality of images of the damaged vehicle, and the system 100 uses this plurality of images to determine the vehicle's deformation data. Typically, at least some of the plurality of images of the damaged vehicle are two-dimensional (e.g., "2-D") images, such as those that are taken by a digital camera, that may be manipulated only in two-dimensions, e.g., enlarged in size, reduced in size, rotated within a plane, translated within a plane, etc.

One of many techniques that may be used by the system 100 to determine vehicle deformation data from a plurality of deformation images is described in U.S. Pat. No. 8,239,220, co-owned with the present disclosure, and the entire disclosure of which is incorporated by reference herein. In an embodiment, to determine the deformation data of the damaged vehicle, the system 100 causes a photogrammetric analysis or other suitable type of image processing to be performed on the plurality of images to determine, construct, or create a composite image, e.g., a single composite image of the damaged vehicle, thereby, in a sense, converting the plurality of images (at least some of which are 2-D) into a composite, 3-D image. The created composite image may be a three-dimensional (e.g., "3-D") composite image or 3-D model that, in an embodiment, may be manipulated in three-dimensions so as to better view particular portions or areas of the damaged vehicle. For example, the 3-D model or composite image is able to be rotated in three-dimensions to view the front bumper head-on, and then subsequently rotated in three-dimensions to view the roof of the vehicle head-on, etc. As such, all surfaces of the vehicle (and any respective damage thereto) are viewable using the single, 3-D composite image or model. The photogrammetric analysis may utilize any known or desired image analysis and composition technique or techniques to construct the composite image of the damaged vehicle, such as camera calibration, pose estimation, triangulation, bundle adjustment, and/or other suitable techniques. In an embodiment, one or more image processors perform the photogrammetric analysis on the plurality of images to generate the composite, three-dimensional image or model therefrom. In an embodiment, creating or constructing the composite image of the damaged vehicle is performed by the system 100 without requesting, receiving, and/or requiring any user input. For example, the system 100 may create or construct the composite image of the damaged vehicle without requiring a user to select particular images, acquire additional images of the damaged vehicle, identify objects within the images, etc.

Upon determining the composite image, the system 100 performs a deformation analysis, for example, by comparing or mapping the generated composite image against an image of a comparable, undamaged vehicle, which may also be a three-dimensional image or model. In an example, the deformation analysis utilizes one or more image processing techniques to compare the reconstructed composite image data points of the damaged vehicle with the geometry of an undamaged vehicle, and the differences between the data points of the images are determined, characterized, and/and quantified from the comparison. In an embodiment, a segment or portion of the composite image (e.g., a panel of the vehicle, or other portion of the surface area of the vehicle) may be compared against a corresponding segment or portion of the pristine image, and differences therebetween may be represented by a vector, one or more numerical values, or other indicator that is representative or descriptive of the identity, quantity, and/or quality of the differences between various characteristics of the portions of the images. For example, various magnitudes of deformation at various corresponding points or locations (e.g., data points) of the segment or portion may be represented by one or more vectors, numerical values, or other indications. As such, the determined differences in the data points between the composite image and the image of the undamaged vehicle may represent, indicate, define, be extracted from, and/or form the crush profile of the damaged vehicle, and at least some of these determined differences may be provided or indicated to the system 100 as deformation data of the damaged vehicle. In a sense, the system 100 converts the composite image of the damaged vehicle into representative values (e.g., a vector, a set, an array, or other suitable representation) that are indicative or characteristic of the amount and degree/extent of damage at various locations on or of the vehicle. Alternatively, in some embodiments, the content of at least some of the determined differences may be converted into a desired format (such as CDC or other standard format), and may be provided or indicated to the system 100 as deformation data of the damaged vehicle.

In an embodiment, one or more image processors perform the deformation analysis by utilizing one or more suitable image processing techniques. In some embodiments, the one or more image processors that perform the deformation analysis are integral with the one or more image processors that perform the photogrammetric analysis.

In an embodiment, generating the deformation data of the damaged vehicle is performed by the system 100 without requesting, receiving, and/or requiring any user input. For example, the system 100 may generate the deformation data of the damaged vehicle without requiring a user to annotate, highlight, or otherwise indicate potential areas of damage shown in the vehicle images.

Thus, as described above, the system 100 obtains deformation data for the damaged vehicle, e.g., by obtaining at least part of the deformation data in the request, and/or by receiving a plurality of images of the damaged vehicle and determining at least some of the deformation data by causing a photogrammetric analysis of the images to be performed to generate a composite image, and causing a deformation analysis to be performed on the composite image to generate the deformation data.

Additionally, in some cases, the request for the vehicle claim information for the particular vehicle insurance claim includes one or more values corresponding to one or more other claim attributes of vehicle insurance claims, e.g., parameters corresponding to the insurance policy covering the damaged vehicle (e.g., deductible, identifications of authorized repair facilities, etc.); data specific to the particular vehicle, such as a VIN (Vehicle Identification Number); a desired level of repair quality; and/or other data indicative of attributes of vehicle insurance claims. One or more of these other received claim attribute or parameter values may be utilized to predict, determine, and/or generate the requested vehicle claim information, or none of the other received claim attribute values may be utilized.

Furthermore, it is noted that the request received by the system 100 may take any known form, such as a message, a data transfer, a web-service call, or some other action taken by an application or function.

From the specific claim data included in the request, the instructions 120 determine the values for some or all of the independent variables of the predictive deformation model 118, and provide at least some of the values as inputs to the deformation model 118. When a request does not reference valid values for all independent variables of the predictive deformation model 118, the instructions 120 may attempt to provide a best fit. For example, the instructions 120 may ignore independent variables for which no or an invalid value was provided in the request, or the instructions 120 may assign a default value for those independent variables. In some cases, particular claim attributes may be provided as inputs to the predictive deformation model 118 irrespective of whether or not they are independent variables of the predictive deformation model 118. For example, at least part of the deformation data may be provided as inputs to the deformation model 118.

The computer-executable instructions 120 may predict, determine, and/or generate the vehicle claim information for the subject vehicle (e.g., one or more replacement parts, labor types and costs, amounts, scores, other items and/or information that is or may be generated by resolving a vehicle insurance claim, and/or other information corresponding to repairing the subject vehicle) based on the inputs and on the mappings of the predictive deformation model 118. For example, the computer-executable instructions 120 may cause one or more claim attribute or parameter values to be input into the predictive deformation model 118, which then generates, as an output, respective indications of the one or more predicted and/or determined replacement parts, materials or items, labor types and costs, amounts, scores, other vehicle claim information, and/or other information or resources corresponding to repairing the subject vehicle.

In some embodiments, the predictive deformation model 118 stored in the system 100 is trained or updated to account for additional claim data (e.g., additional vehicle claim data) that has been added to the claim data 111. Training or updating may be triggered periodically at a given interval, such as weekly, monthly or quarterly. Training or updating may be triggered when a particular quantity of additional data points has been added to the original claim data 111. In some embodiments, prior to training, some portion of the original claim data 111 is deleted, such as older labor cost data that no longer accurately reflects labor market wages. Additionally or alternatively, training or updating may be triggered by a user request.

When a trigger to update the predictive deformation model 118 is received by the system 100, the system 100 may perform some or all of the instructions 115 to re-determine at least a portion of the deformation model 118 based on the additional claim data or a new set of claim data. The re-determination may operate on only the additional claim data, or may operate on an aggregation of one or more portions of the original claim data 111 and the additional claim data. The re-determination may include repeating some or all of the steps originally used to determine the original predictive deformation model 118 on the additional claim data. For example, the re-determination may include performing predictive analysis on the additional claim data to determine if the additional claim data statistically supports revising the independent variables of the predictive deformation model 118. In another example, the re-determination may include performing cluster analysis on the aggregation of the additional claim data and at least a portion of the original claim data. The exact set of steps to be repeated on the additional claim data may be selectable, and/or may vary based on factors such as a quantity of additional data points, time elapsed since the last update, a user indication, or other factors. The re-determination may result in an updated deformation model 118, which then may be stored in the system 100.

Note that the predictive deformation model 118 generated by the system 100, and in particular, updates to the predictive deformation model 118 may result in more accurate potential cost estimates over time. With the system 100, the deformation model 118 may be continually updated with additional claim data, thus ensuring a more statistically accurate reflection of identities and values of independent variables, and accordingly, a more statistically accurate prediction of an amount of a supplement.

Additionally, although FIG. 1 illustrates both the instructions for determining a predictive deformation model 118 and the instructions for responding to requests 120 being stored and executed by the same computing device 102, in some embodiments, the two sets of instructions 115, 120 are stored on and executed by different computing devices or systems that may be in communicative connection with each other. Further, in some scenarios, the computing device 102 is associated with, owned or operated by the insurance company that issued the policy under which the damaged vehicle is covered. For example, the computing device 102 may be a back-end server or network of computing devices of the insurance company that stores and executes the instructions 120 for responding to requests (e.g., from computing devices 122 of field assessors or agents), and may be in communicative connection with another computing device (not shown) that stores and executes the instructions 115 for determining the deformation model 118.

In some scenarios, the computing device 102 is associated with, owned or operated by the repair facility that is to repair the damaged vehicle. For example, the computing device 102 may be a back-end server or network of computing devices of an owning parent company of the repair facility that stores and executes the instructions 120 for responding to requests from multiple computing devices 122 of various repair facility store fronts or franchise locations, and may be in communicative connection with another computing device (not shown) that stores and executes the instructions 115 for determining the predictive deformation model 118.

In some scenarios, the computing device 102 is associated with, owned or operated by a third party that is not the insurance company that issued the policy under which the damaged vehicle is covered, and is not one of the repair facilities that is to repair the vehicle damages. For example, the computing device 102 may be associated with a company or organization that provides predictive products and resources to multiple insurance companies, repair facilities, and other companies or entities associated with repairing damages to insured vehicles.

Figure 3:
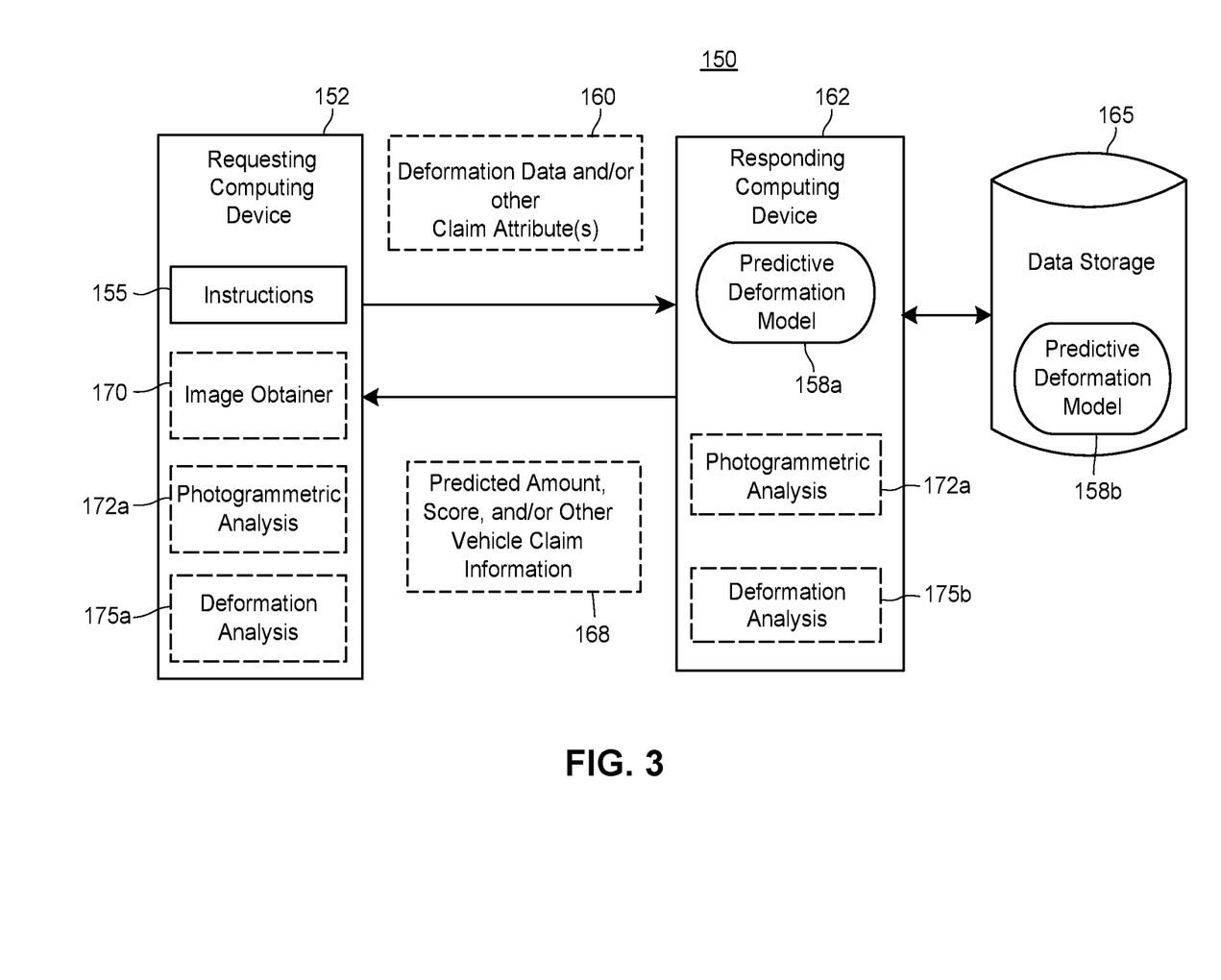
FIG. 3 is an example data flow in an exemplary system configured to determine or predict, using a predictive deformation model, vehicle insurance claim information including replacement parts and/or other items or information corresponding to repairing a damaged vehicle.

FIG. 3 depicts an exemplary data flow in an embodiment of a system 150 that includes a computing device 152 particularly configured to predict, determine, and/or generate vehicle claim information (e.g., replacement parts, replacement part types, labor types, labor costs, other costs, amounts, scores, other items, and/or other information that is or that may be generated by the process of resolving a vehicle insurance claim, and/or other information needed for and/or corresponding to repairing a damaged vehicle) based on a predictive deformation model. The computing device 152 may be a general purpose computing device with a memory, a processor, and computer-executable instructions 155 stored on its memory and executable by its processor. The computing device 152 may operate in conjunction with embodiments of the system 100 of FIG. 1, and in some embodiments, the computing device 152 may be the requesting computing device 122 of FIG. 1.

In FIG. 3, the instructions 155 stored on the computing device 152 include instructions for obtaining values of claim attributes or parameters corresponding to a damaged vehicle for which one or more types of vehicle claim information is desired to be predicted, determined, and/or generated from deformation data. The damaged vehicle may be a subject vehicle of a vehicle insurance claim, for example. The values may be obtained via a user interface, by reading from a file, by extracting from a message, or by any other known means of obtaining values, and the obtained values include values of deformation data indicative or descriptive of damage to the subject vehicle. The obtained values may optionally include other values corresponding to any other claim parameter or combination of claim parameters, such as those included in the previously discussed list, or other parameters. Obtaining the values of parameters may be limited to obtaining only the values of specific parameters that have been determined to be independent variables of a predictive deformation model 158, for example, when user interface prompts a user to enter only the specific parameters corresponding to the independent variables of the model 158, or when the instructions 155 automatically extract values of only desired specific parameters.

In some embodiments, the instructions 155 include instructions for obtaining a selection or indication of one or more particular types of vehicle claim information (e.g., one or more particular parts, materials, labor types, labor costs, amounts, scores, and/or other vehicle claim information) that is to be predicted, determined, and/or generated based on the deformation data. For example, the selection of the vehicle information type or types may be indicated by a user interface, in a message, by an indicator stored in a database, or by some other mechanism.

The instructions 155 in FIG. 3 further include instructions for obtaining, based on the values of the obtained parameters, predicted, determined, and/or generated vehicle claim information (e.g., parts, materials, other items, costs, amounts, scores, and/or other information corresponding to the subject damaged vehicle) as determined by a predictive deformation model 158. As shown in FIG. 3, the predictive deformation model 158 may be entirely stored at a computing device 162 (e.g., reference 158a), the deformation model 158 may be entirely stored at a data storage entity 165 that is accessible to the computing device 162 (e.g., reference 158b), or the deformation model 158 may be stored across both the computing device 162 and the data storage device 165 (e.g., references 158a and 158b).

In the system 150, to obtain the predicted determined, and/or generated vehicle claim information, the computing device 152 requests 160 another computing device 162 that is particularly configured to access a predictive deformation model 158. The requesting 152 and the responding 162 computing devices may be directly or remotely connected via one or more public and/or private networks. In some embodiments of the system 150, the requesting computing device 152 and the responding computing device 162 may have a client/server relationship. In some embodiments, the computing devices 152 and 162 may have a peer-to-peer or cloud computing relationship, or the computing devices 152 and 162 may be an integral computing device. Other relationships between the computing devices 152 and 162 are also possible. Thus, the request 160 may take any known form, such as sending a message, transferring data, or performing a web-service call.

In some embodiments, the request 160 includes values of deformation data descriptive or indicative of the damage to the vehicle. The request 160 may additionally or alternatively include respective values of one or more other claim attributes or parameters corresponding to the subject damaged vehicle. In some embodiments, the values of only the claim attributes/parameters that have been determined to be independent variables of the predictive deformation model 158 are included in the request 160.

Upon receiving the request 160, the responding computing device 162 determines, predicts, and/or generates the vehicle claim information based on the respective values of the one or more claim attributes and/or parameters included in the request 160 and the predictive deformation model 158. For example, one or more of the claim attribute values included in the request 160 are input into the deformation model 158. Similar to the system 100 of FIG. 1, if the request 160 omits or provides an invalid value for a particular claim attribute that is an independent variable of the predictive deformation model 158, the computing device 162 may process the request 160 based on a best fit of the provided values in the request 160. The responding computing device 162 returns the predicted vehicle insurance claim information 168 (e.g., the predicted amount, score, and/or other information that may be produced during the resolution of the vehicle insurance claim) to the requesting computing device 152.

The requesting computing device 152 receives the predicted vehicle insurance claim information 168 for the vehicle insurance claim from the responding computing device 162, and may cause an indication of the predicted vehicle insurance claim information 168 for the vehicle insurance claim to be presented at a user interface (e.g., of the requesting computing device 152 or of another computing device). In some embodiments, the requesting computing device 152 causes the predicted vehicle insurance claim information 168 to be transmitted to another computing device.

In some embodiments, the computing device 152 of the system 150 includes instructions 170 for obtaining plurality of images of the subject vehicle, e.g., of the damaged portions of the subject vehicle. The actual plurality of images of the subject vehicle is included in a request to predict, determine, and/or generate vehicle claim information, in some scenarios. Alternatively, rather than actual images themselves, the request may include indications of the plurality of images, and the instructions 170 pull the plurality of images from an area in which they are stored, or may actively request delivery of the actual plurality of images based on the indications received in the request.

In the embodiments in which the computing device 152 obtains a plurality of images of the subject vehicle (e.g., by using the instructions 170), the system 150 includes further instructions 172 for causing a photogrammetric analysis to be performed on the plurality of images. The photogrammetric analysis 172 may be performed by the computing device 152 (e.g., by the instructions 172a), by the computing device 162 (e.g., by the instructions 172b), or by both computing devices 152, 162 operating in concert (e.g., by both the instructions 172a and 172b). As previously discussed, the plurality of images of the subject vehicle is an input into the photogrammetric analysis 172, and a composite image (e.g., a three-dimensional image or three-dimensional model) of the subject vehicle is an output of the photogrammetric analysis 172. For example, the composite image produced by the photogrammetric analysis 172 may be a crush profile of the subject vehicle.

In some embodiments, the system 150 includes instructions 175 for performing a deformation analysis on a crush profile or composite image of the subject vehicle. The deformation analysis 175 may be performed by the computing device 152 (e.g., by the instructions 175a), by the computing device 162 (e.g., by the instructions 175b), or by both computing devices 152, 162 operating in concert (e.g., by both the instructions 175a and 175b). Indeed, in some embodiments (not shown), the photogrammetric analysis 172 and the deformation analysis 175 are an integral set of computer-executable instructions. Additionally, the crush profile or composite image on which the deformation analysis 175 is performed may be, for example, the output of the photogrammetric analysis 172 performed by the system 150. Alternatively, the crush profile of the vehicle may have been obtained by the system 150 by some other means, such as receiving the crush profile from another computing device or system or by retrieving the crush profile from a data storage device.

The deformation analysis 175 compares or maps the crush profile or composite image of the subject vehicle with an image of a comparable, undamaged vehicle, which may be obtained, for example, from the data storage device 165 or from some other data storage entity. Based on the comparison or mapping, the deformation analysis 175 generates, as an output, deformation data of the subject vehicle, and the deformation data may be provided to the instructions 155 or to the predictive deformation model 158. Accordingly, in an embodiment, the deformation data is extracted or formed from crush profile data. In an example, performing the deformation analysis 175 transforms or converts the crush profile data or a vehicle into deformation data.

Figure 4:
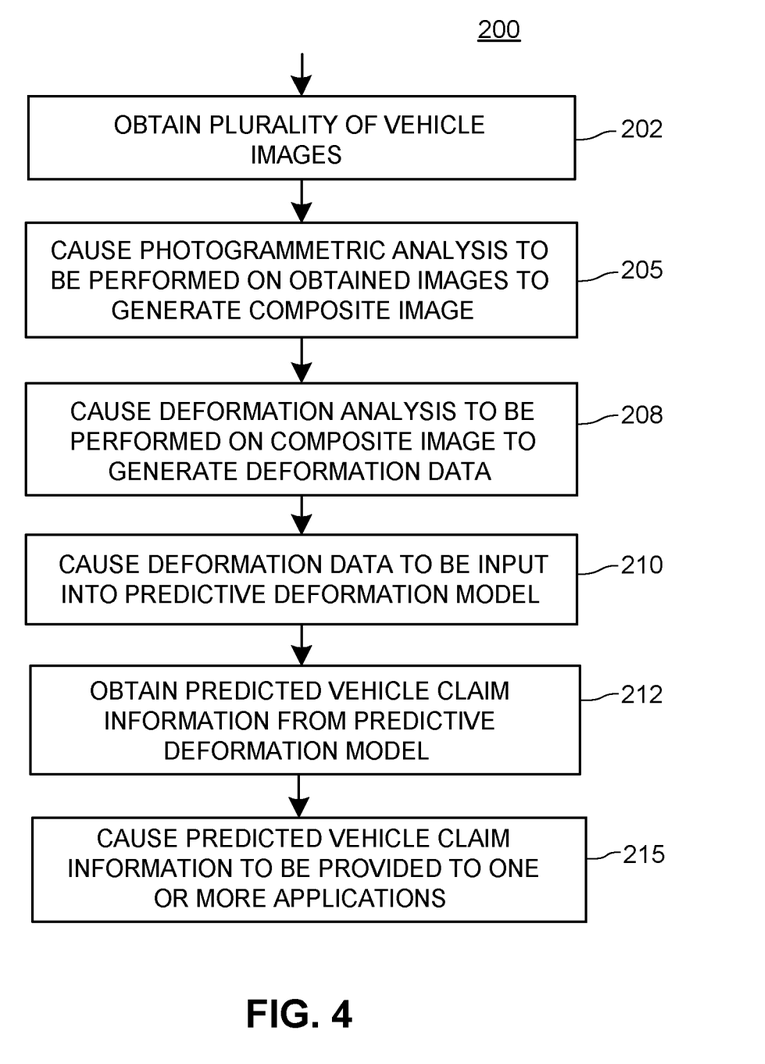
FIG. 4 is an example method for predicting vehicle insurance claim information including replacement parts, other items, and/or other vehicle insurance claim information based on vehicle deformation images.

FIG. 4 is an embodiment of a method 200 of predicting vehicle claim information based on vehicle deformation images. Embodiments of the method 200 may be used in conjunction with one or more of the systems of FIGS. 1 and 3, and with the previously discussed list of possible claim attributes or parameters, and/or with other parameters. For example, the method 200 may be performed by the computing device 102, the computing device 152, and/or the computing device 162. For ease of discussion, and not for limitation purposes, the method 200 is described with simultaneous reference to FIGS. 1 and 3, although the method 200 may be performed by or in conjunction with systems other than the system 100 of FIG. 1 and/or other than the system 150 of FIG. 3.

The method 200 includes obtaining 202 a plurality of images of damage to a vehicle, which may or may not be covered by a vehicle insurance policy issued by an insurance carrier. Typically, the plurality of images includes images of damaged portions of the vehicle, and the images may capture the vehicle from different angles. Typically, at least some of the images are two-dimensional images. In an example, the plurality of images are obtained (block 202) at a computing device 102 of a system 100 configured to predict, determine, and/or generate vehicle claim information (e.g., one or more replacement parts, materials, items, labor types, labor costs, other costs, amounts, scores, and/or other information or resources that are or may be needed or correspond to repairing damaged vehicles). The plurality of images may be obtained by electronically receiving the images from another computing device, the plurality of images may be received via a camera interface of the computing device 102, and/or the computing device 102 may retrieve the plurality of images from a data storage area.

The plurality of images are used by the method 200 to predict, determine, and/or generate one or more types of vehicle claim information (e.g., indications of one or more replacement parts, labor types, labor costs, other costs, amounts, scores, resources, items, and/or other information that is or may be generated during the claims resolution process for vehicle insurance claims, and/or other information corresponding to repairing the damaged vehicle) corresponding to the damaged vehicle. For example, the method 200 may use the images to predict, determine, and/or generate respective indications of one or more replacement parts, items, and/or other resources or information needed for and/or corresponding to repairing the damaged vehicle, an amount of a settlement of an insurance claim, an amount of a supplement of an insurance claim, and/or one or more other values or information corresponding to repairing the damaged vehicle. Additionally or alternatively, the method 200 may use the images to predict a score corresponding to the vehicle insurance claim, such as a customer satisfaction score or a score indicative of a probability of an occurrence of an event during the claims resolution process. In an embodiment, the method 200 includes receiving an indication of one or more types of vehicle claim information that is desired to be predicted, determined, and/or generated.

The method 200 includes causing a photogrammetric analysis to be performed on the plurality of images of the damaged vehicle (block 205). For example, the computing device 102 itself may perform the photogrammetric analysis 205, or the computing device 102 may request another application, device, or system to perform the photogrammetric analysis 205. In an embodiment, the computing device 102 includes an image processor that performs the photogrammetric analysis 205. Typically, the output of the photogrammetric analysis 205 includes a composite image of the damaged vehicle (which may, in some cases, be a single, three-dimensional image or three-dimensional model). As such, performing the photogrammetric analysis on the plurality of images (block 205) creates or generates a composite image that, prior to the execution of block 205, had not previously existed. In an embodiment, performing the photogrammetric analysis on the plurality of images of the damaged vehicle (block 205) transforms or converts the plurality of images, at least some of which are two-dimensional, into a single, three-dimensional, composite image or model of the damaged vehicle.

Additionally, the method 200 includes causing a deformation analysis to be performed on the composite image of the damaged vehicle (block 208). For example, the computing device 102 itself may perform the deformation analysis 208, or the computing device 102 may request another application, device, or system to perform the deformation analysis 208. In an embodiment, the computing device 102 includes an image processor that performs the deformation analysis 208. The image processor that performs the deformation analysis 208 may be the same image processor as the image processor which generates the composite image of the damaged vehicle (block 205), or maybe a different image processor. Typically, the output of the deformation analysis 208 includes deformation data for the damaged vehicle. The deformation data includes a plurality of data points, vectors or other indicators, each of which is indicative or descriptive of a particular portion of the damaged vehicle and respective deformation or deformations thereto.

Further, the method 200 includes causing the deformation data of the damaged vehicle to be input into or provided to a predictive deformation model (e.g., the model 158 of FIG. 3) to predict, determine, and/or generate the vehicle claim information corresponding to the damaged vehicle (block 210). In an embodiment, the deformation model generates, based on at least part of the deformation data, respective indications of one or more replacement parts needed to repair the damaged vehicle, and/or other information corresponding to repairing the damaged vehicle. The predictive deformation model is generated based on a data analysis performed on historical vehicle insurance claim data, and as previously discussed, the data analysis performed on the historical claim data may be, for example, a linear regression analysis, a multivariate regression analysis such as the Ordinary Least Squares algorithm, a logistic regression analysis, a K-th nearest neighbor (k-NN) analysis, a K-means analysis, a Naïve Bayes analysis, another suitable or desired predictive data analysis, one or more machine learning algorithms, or some combination thereof. The historical vehicle insurance claim data may include partial and total loss vehicle claim data obtained or collected from one or more insurance companies and/or from other sources such as repair shops, body shops, accident report databases, etc. Generally, the historical claim data corresponds to vehicle insurance claims that have been resolved, and includes respective values of claim attributes and/or parameters such as deformation data, replacement parts that were used, labor types and costs, other costs incurred during repairing vehicles, settlement estimates and corresponding repairs, supplement amounts and corresponding repairs, whether or not re-inspections were performed, final settlement amounts, payouts to insured parties, dates of claims, identifications of one or more repair facilities and their locations, a level of quality of the repairs, customer service indicator scores, actual values of other vehicle claim amounts and/or scores, any of the claim parameters in the previously discussed list, and/or other parameters or information.

The predictive deformation model (e.g., the deformation model 158) is configured to generate or output a prediction, determination, and/or generation of information needed for or corresponding to the repair of a subject damaged vehicle based on respective values of one or more claim attributes or parameters corresponding to the subject damaged vehicle that are input into the model. The inputs into the predictive deformation model include at least some of the deformation data of the subject vehicle, and optionally one or more values of one or more claim attributes that were determined, by the data analysis, to be more strongly correlated to a magnitude of the desired information than are other claim attributes. Based on the inputs (e.g., independent variables of the model) and one or more mappings included in the model, the model determines one or more outputs (e.g., dependent variables of the model), which include therein the desired information corresponding to the subject damaged vehicle.

The method 200 includes obtaining or receiving the predicted, determined, and/or generated vehicle claim information from the deformation model (block 212), and indications of at least some of the obtained/received information may be provided to a user interface application and/or to another application at a recipient computing device, e.g., at the computing device 102, 122, 152 or another computing device (block 215). For example, at least some of the indications are provided 215 to a user interface of the computing device 102 or to a remote user interface (e.g., via a web portal), and/or at least some of the indications are transmitted 215 to another computing device (e.g., a computing device associated with the repair facility or a back-end system of an insurance carrier). Typically, the indication(s) of the predicted vehicle claim information is provided 215 to the user interface and/or to another computing device 215 at an early stage of the claims resolution process or even at the beginning of the claims resolution process, e.g., at FNOL. Indeed, in some embodiments, the entirety of the method 200 is performed at FNOL, e.g., by a computing device or tablet of a field assessor, or by a field computing device or tablet in conjunction of a back-end system.

In an embodiment, the entirety of the method 200 is performed without requesting and/or receiving any user input, except for the received plurality of images of the damaged vehicle. That is, from a user's perspective, he or she may merely provide the plurality of images of a damaged vehicle to the method 200, and consequently may receive the generated vehicle claim information, e.g., indications of replacement parts, other items, and/or other information needed for or corresponding to repairing the damaged vehicle. In an embodiment, at least some of the blocks 205-215 of the method 200 are performed without requesting and/or receiving any user input. For instance, generating the composite image of the damaged vehicle (block 205) may performed without any user input, e.g., without requiring the user to select particular images, take additional images, etc. Additionally or alternatively, generating the deformation data of the damaged vehicle (block 208) may be performed without requesting and/or receiving any user input. For example, generating the deformation data of damaged vehicle (block 208) is performed without requiring a user to annotate, highlight, or otherwise indicate potential areas of damage shown in the vehicle images.

The techniques, systems, methods and apparatuses described herein for determining or predicting vehicle claim information that is or may be generated or produced during the claims resolution process, allow the claims resolution process to be streamlined for the insurance company, the insured party, and the repair facility so that all parties are able to save time and costs during the claims resolution process. Indeed, the techniques, systems, methods and apparatuses of the present application allow such vehicle claim information to be predicted with much greater accuracy and much earlier in the claims resolution process than is able to be done by a human agent, inspector, or repair facility employee, as the predictions are obtained from a predictive deformation model that has been generated based on a plethora of historical claim data from multiple insurance carriers and other sources. Accordingly, as the predictions of the vehicle claim information are based on a rigorous, statistical analysis of a much wider claim data base than is known to any single agent, inspector, repair facility employee, or insurance carrier, and hence is more accurate, the average variance of actual amounts or scores for vehicle insurance claims decreases with the techniques described herein, and both the insurance carriers and repair facilities are able to use the more accurate predictions that are obtained earlier in the claims resolution process to improve their businesses and improve their customer satisfaction and experiences.

In fact, as more and more claim data is added to the historical claim data set and the predictive deformation model is refined over time, the accuracy of the predicted vehicle claim information may increase to a level where the confidence in the predicted amounts and/or scores is significantly increased, and indeed, is statistically accurate. At this point of accuracy, the insurance company and the repair facility may agree on the final settlement amount early in the claims resolution process, e.g., at FNOL. Similarly, the insurance company may be able to provide a settlement to the insured party early in the claims resolution process, e.g., at FNOL. As such, significant cost and time savings for the claims resolution process may be realized.

Although the disclosure describes example methods and systems including, among other components, software and/or firmware executed on hardware, it should be noted that these examples are merely illustrative and should not be considered as limiting. For example, it is contemplated that any or all of the hardware, software, and firmware components could be embodied exclusively in hardware, exclusively in software, or in any combination of hardware and software. Accordingly, while the disclosure describes example methods and apparatus, persons of ordinary skill in the art will readily appreciate that the examples provided are not the only way to implement such methods and apparatus.

When implemented, any of the computer readable instructions or software described herein may be stored in any computer readable storage medium or memory such as on a magnetic disk, a laser disk, or other storage medium, in a RAM or ROM of a computer or processor, portable memory, etc. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention. It is also recognized that the specific approaches described herein represent but some of many possible embodiments as described above. Consequently, the claims are properly construed to embrace all modifications, variations and improvements that fall within the true spirit and scope of the invention, as well as substantial equivalents thereof. Accordingly, other embodiments of the invention, although not described particularly herein, are nonetheless considered to be within the scope of the invention.

What is claimed is:

1. A system, comprising:
a network interface via which a plurality of images of a damaged vehicle is received;
a composite image generator component configured to construct a composite, three-dimensional image of the damaged vehicle from the plurality of images of the damaged vehicle;
a damage profile generator component configured to compare the constructed, composite three-dimensional image of the damaged vehicle to a stored, three-dimensional image of an undamaged vehicle, and to generate deformation data corresponding to a crush profile of the damaged vehicle based on the comparison;
one or more data storage devices storing historical claim data of a plurality of historical vehicle insurance claims;
an access mechanism to the historical claim data;
a deformation model component configured to generate, based on the generated deformation data of the damaged vehicle, respective indications of one or more replacement parts needed to repair the damaged vehicle,
the deformation model component including a deformation model generated from accessing, via the access mechanism, the historical claim data of the plurality of historical vehicle insurance claims and performing a regression analysis on the accessed historical claim data to determine a subset of a plurality of claim attributes that are more strongly correlated to actual replacement parts corresponding to the plurality of historical vehicle insurance claims than are other attributes of the plurality of claim attributes, and
the historical claim data including deformation data of the plurality of historical vehicle insurance claims, respective indications of the actual replacement parts of the plurality of historical vehicle insurance claims, and a plurality of other claim attributes of the plurality of historical vehicle insurance claims; and
an output interface via which the generated, respective indications of the one or more replacement parts are provided to at least one of the network interface or a user interface.

2. The system of claim 1, wherein the plurality of historical vehicle insurance claims includes historical vehicle insurance claims corresponding to a plurality of insurance carriers.

3. The system of claim 1, wherein the plurality of images of the damaged vehicle is received via the network interface of the system and the generated respective indications of the one or more replacement parts is provided via the output interface of the system at First Notice of Loss (FNOL).

4. The system of claim 1, wherein the deformation model component generates the respective indications of the one or more replacement parts further based on a level of repair quality.

5. The system of claim 1, wherein the deformation model component generates the respective indications of the one or more replacement parts further based on a customer satisfaction score.

6. The system of claim 1, wherein the respective indications of the one or more replacement parts includes at least one indication of a replacement part type selected from: OEM (Original Equipment Manufacturer), new, recycled, reconditioned, or another replacement part type.

7. The system of claim 1, wherein the deformation model component is configured to generate respective indications of one or more labor types and/or labor costs needed to repair the damaged vehicle based on the deformation data, the regression analysis from which the deformation model is generated determines another subset of the plurality of claim attributes that are more strongly correlated to actual labor types and/or labor costs corresponding to the plurality of historical vehicle insurance claims than are other attributes of the plurality of claim attributes, the historical claim data includes respective indications of the actual labor types and/or labor costs of the plurality of historical vehicle insurance claims, and the generated, respective indications of the one or more labor types and/or labor costs are provided to the at least one of the network interface or the user interface via the output interface of the system.

8. The system of claim 1, wherein the deformation model component is configured to generate a settlement amount corresponding to repairing the damaged vehicle based on the deformation data, the regression analysis from which the deformation model is generated determines another subset of the plurality of claim attributes that are more strongly correlated to actual settlement amounts corresponding to the plurality of historical vehicle insurance claims than are other attributes of the plurality of claim attributes, the historical claim data includes respective indications of the actual settlement amounts of the plurality of historical vehicle insurance claims, and the generated settlement amount is provided to the at least one of the network interface or the user interface via the output interface of the system.

9. The system of claim 1, wherein the deformation model component is configured to generate a payout amount of an insured party corresponding to repairing the damaged vehicle based on the deformation data, the regression analysis from which the deformation model is generated determines another subset of the plurality of claim attributes that are more strongly correlated to actual payout amounts corresponding to the plurality of historical vehicle insurance claims than are other attributes of the plurality of claim attributes, the historical claim data includes respective indications of the actual payout amounts of the plurality of historical vehicle insurance claims, and the generated payout amount is provided to the at least one of the network interface or the user interface via the output interface of the system.

10. The system of claim 1, wherein the deformation model component is configured to generate respective indications of one or more respective values of one or more other parameters corresponding to repairing the damaged vehicle based on the deformation data, the regression analysis from which the deformation model is generated determines another subset of the plurality of claim attributes that are more strongly correlated to actual respective values of the one or more other parameters corresponding to the plurality of historical vehicle insurance claims than are other attributes of the plurality of claim attributes, the historical claim data includes respective indications of the actual respective values of the one or more other parameters of the plurality of historical vehicle insurance claims, and the generated, respective indications of the one or more respective values of the one or more other parameters are provided to the at least one of the network interface or the user interface via the output interface of the system.

11. The system of claim 10, wherein the one or more other parameters include at least one of: a level of repair quality, a customer satisfaction score, a settlement amount, a towing cost, a paint cost, a tire cost, a re-inspection occurrence, a re-inspection cost, a hazardous waste disposal cost, a replacement part type, a payout amount of an insured party, a supplement occurrence, a supplement cost, a number of labor hours, a labor cost, or a labor type.

12. The system of claim 1, wherein at least one of the network interface, the composite image generator component, the damage profile generator component, the deformation model component, or the output interface comprises hardware.

13. The system of claim 12, wherein at least one of the network interface, the composite image generator component, the damage profile generator component, the deformation model component, or the output interface comprises software or firmware.

14. The system of claim 13, wherein the software comprises a set of computer-executable instructions stored on one or more memories, the hardware comprises the one or more memories, and the system further comprises one or more processors for executing the set of computer-executable instructions.

15. The system of claim 1, further comprising one or more data storage devices storing, in conjunction with an indication of a vehicle insurance claim corresponding to the damaged vehicle, at least one of (i) the composite, three-dimensional image of the damaged vehicle constructed by the composite image generator component, (ii) the crush profile of the damaged vehicle, (iii) the respective indications of the one or more replacement parts needed to repair the damaged vehicle generated by the deformation model component, or (iv) respective indications of one or more respective values of one or more other parameters corresponding to repairing the damaged vehicle generated by the deformation model component.

16. The system of claim 1, wherein at least one of (i) the composite, three-dimensional image of the damaged vehicle constructed by the composite image generator component, (ii) the crush profile of the damaged vehicle, or (iii) respective indications of one or more respective values of one or more other parameters corresponding to repairing the damaged vehicle generated by the deformation model component are provided to the at least one of the network interface or the user interface via the output interface of the system.

17. The system of claim 1, wherein the composite image generator component and the damage profile generator component are included in an integral component.

18. The system of claim 17, wherein the deformation model component is included in the integral component.

19. A method of image processing, comprising:
obtaining, via a network interface, a plurality of images of a damaged vehicle;
constructing, by using a composite image generator component, a composite, three-dimensional image of the damaged vehicle from the plurality of images of the damaged vehicle;
using a damage profile generator component to:
compare the constructed, composite three-dimensional image of the damaged vehicle with a stored, three-dimensional image of an undamaged vehicle; and
based on the comparison of the constructed, composite three-dimensional image of the damaged vehicle with the stored, three-dimensional image of the undamaged vehicle, at least one of generate a crush profile of the damaged vehicle or generate deformation data corresponding to the crush profile of the damaged vehicle;
generating, by using a deformation model component and based on the generated deformation data, the respective indications of the one or more replacement parts needed to repair the damaged vehicle,
the deformation model component including a deformation model generated from accessing, via an access mechanism, historical claim data of a plurality of historical vehicle insurance claims stored on one or more storage devices, and performing a regression analysis on the accessed historical claim data of the plurality of historical vehicle insurance claims to determine a subset of a plurality of claim attributes that are more strongly correlated to actual replacement parts corresponding to the plurality of historical vehicle insurance claims than are other attributes of the plurality of claim attributes, the historical claim data including deformation data of the plurality of historical vehicle insurance claims, respective indications of the actual replacement parts of the plurality of historical vehicle insurance claims, and a plurality of other claim attributes of the plurality of historical vehicle insurance claims; and
providing, via an output interface, the generated, respective indications of the one or more replacement parts needed to repair the damaged vehicle to a recipient.

20. The method of claim 19, wherein the method is performed at First Notice of Loss (FNOL) corresponding to the damaged vehicle.

21. The method of claim 19, further comprising ordering the one or more replacement parts.

22. The method of claim 19, further comprising repairing the damaged vehicle using the one or more replacement parts.

* * * * *